(12) United States Patent  
Paek et al.

(10) Patent No.: US 8,628,231 B2
(45) Date of Patent: Jan. 14, 2014

(54) DIFFUSION PLATE AND DISPLAY APPARATUS HAVING THE SAME

(75) Inventors: Jung-Wook Paek, Suwon-si (KR); Myung-Woon Lee, Seoul (KR); Jinsung Choi, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 526 days.

(21) Appl. No.: 12/719,414

(22) Filed: Mar. 8, 2010

(65) Prior Publication Data

US 2010/0321923 A1 Dec. 23, 2010

(30) Foreign Application Priority Data

Jun. 23, 2009 (KR) .................... 10-2009-0056147

(51) Int. Cl.
 *F21V 7/04* (2006.01)
(52) U.S. Cl.
 USPC ............ 362/628; 362/615; 362/616; 362/629
(58) Field of Classification Search
 USPC ................................ 362/615, 617, 628, 629
 See application file for complete search history.

(56) References Cited

U.S. PATENT DOCUMENTS

| 7,338,184 | B2 | 3/2008 | Chen et al. |
| 7,510,308 | B2 | 3/2009 | Goto |
| 7,665,859 | B2 | 2/2010 | Lim |
| 7,722,240 | B2 | 5/2010 | Kodama et al. |
| 7,726,826 | B2 | 6/2010 | Kusano et al. |
| 7,766,528 | B2 | 8/2010 | Epstein et al. |
| 2005/0270654 | A1* | 12/2005 | Goto et al. .................... 359/626 |
| 2007/0242478 | A1 | 10/2007 | Arima et al. |
| 2008/0284943 | A1* | 11/2008 | Jeong et al. .................... 359/599 |
| 2009/0122229 | A1 | 5/2009 | Kim et al. |
| 2009/0168421 | A1 | 7/2009 | Ha et al. |

FOREIGN PATENT DOCUMENTS

| JP | 2007-286261 | 11/2007 |
| KR | 10-2004-0003713 | 1/2004 |
| KR | 10-0728262 | 6/2007 |
| KR | 10-2008-0064955 | 7/2008 |
| KR | 10-2009-0031055 | 3/2009 |

OTHER PUBLICATIONS

English Abstract for Publication No. 10-2004-0003713.
English Abstract for Publication No. 10-2006-0045673.
English Abstract for Publication No. 2007-286261.
English Abstract for Publication No. 10-2008-0064955.
English Abstract for Publication No. 10-2009-0031055.

* cited by examiner

*Primary Examiner* — William Carter
(74) *Attorney, Agent, or Firm* — F. Chau & Associates, LLC (57) ABSTRACT

A diffusion plate includes a base having a top surface and a bottom surface and a plurality of parallel convex ridges integrally formed on the top surface of the base while extending in one direction. Each convex ridge has a cross section shaped as a portion of an ellipse. The display apparatus includes a display panel, a light source and the diffusion plate.

20 Claims, 5 Drawing Sheets

DIFFUSION PLATE AND DISPLAY APPARATUS HAVING THE SAME

CROSS-REFERENCE TO RELATED APPLICATION

This application claims priority from Korean Patent Application No. 2009-56147 filed on Jun. 23, 2009, the contents of which are herein incorporated by reference in their entirety.

BACKGROUND OF THE INVENTION

1. Field of the Invention

The present disclosure is directed to a diffusion plate and a display apparatus having the same. More particularly, the present disclosure is directed to a diffusion plate capable of improving display quality and a display apparatus having the same.

2. Description of Related Art

A liquid crystal display (LCD) includes a display panel to display images. Since the display panel is non-emissive, a light source is necessary. Thus, in addition to the display panel, the LCD includes a backlight unit to emit light to the display panel.

The backlight unit includes a light source, such as a linear light source or a point light source, and an optical sheet through which light generated from the light source passes The optical sheet converts linear light or point light into surface light, thereby improving light brightness.

A display apparatus having slim structure, lower power consumption and low manufacturing cost is desirable. However, the slimness of a display apparatus is limited mainly due to the structure of the backlight unit. In addition, a suitable slim external appearance may be implemented when using fewer lamps, which may also reduce power consumption.

SUMMARY OF THE INVENTION

In one exemplary embodiment of the present invention, a diffusion plate includes a base having a top surface and a bottom surface opposite to the top surface and a plurality of parallel convex ridges formed on the top surface of the base. A planar section of each convex ridge perpendicular to the top surface of the base has a elliptically shaped arc segment, wherein a shape of the elliptically arc segment is described by a chord linking both ends of the arc. The ellipse satisfies the following equation:

$$Ax^2 + By^2 + \sum_{n=0}^{2} C_n x^n + D = 0$$

wherein, A, B and D are coefficients, $C_0$ is a non-zero constant having a predetermined value, $C_1$ is zero, and $C_2$ is $C_0/p^2$ wherein p is a length of the chord.

The length of the chord may be about 150 μm to about 300 μm, and a distance between a vertex of each convex section and the top surface of the base may be about 70 μm to about 200 μm.

The diffusion plate may be made of a resin selected from the group comprising polycarbonate, polystyrene, polymethylmethacrylate, and methacrylate styrene.

The convex ridges may be integrally formed with the base and extend in one direction.

The diffusion plate may be provided between a display panel having a rectangular shape and the plurality of light sources. The plurality of light sources may extend in direction parallel to the convex ridges to emit light to the display panel.

In another exemplary embodiment of the present invention, a display apparatus has the diffusion plate of the one exemplary embodiment of the present invention. The display apparatus includes a display panel, a plurality of light sources disposed below the display panel to emit light, and a diffusion plate disposed between the display panel and the light sources to diffuse the light. The diffusion plate includes a base having a top surface and a bottom surface, and a plurality of convex ridges formed on the top surface of the base. A planar section of each convex section perpendicular to the top surface of the base has a elliptical shaped arc segment, wherein a shape of the elliptically arc segment is described by a chord linking both ends of the arc. The ellipse satisfies the following equation:

$$Ax^2 + By^2 + \sum_{n=0}^{2} C_n x^n + D = 0$$

wherein, A, B and D are coefficients, $C_0$ is a non-zero constant having a predetermined value, $C_1$ is zero, and $C_2$ is $C_0/p^2$ wherein p is a length of the chord.

The convex sections may be integrally formed with the base and extend in one direction.

The diffusion plate may be made of a resin selected from a group comprising polycarbonate, polystyrene, polymethylmethacrylate, and methacrylate styrene.

The length of the chord may be about 150 μm to about 300 μm, and a distance between a vertex of each convex section and the top surface of the base may be about 70 μm to about 200 μm.

The display panel has a rectangular shape.

The plurality of light sources may extend in a direction parallel to the convex ridges. Each light source may be selected from a group comprising a cold cathode fluorescent lamp, an external electrode fluorescent lamp, a hot cathode fluorescent lamp and a light emitting diode. A distance between two adjacent light sources may be about 43 mm to about 58 mm. A distance between each light source and the diffusion plate may be about 16 mm to about 20 mm.

A plurality of optical sheets are further provided between the display panel and the diffusion plate.

According to exemplary embodiments of the present invention, a backlight unit having a diffusion plate provides uniformly diffused light to the display panel even if two adjacent light sources are far apart. Using a diffusion plate according to an embodiment of the invention results in a reduction of the number of light sources employed in the display apparatus, reducing power consumption and manufacturing cost, improving display quality of the display apparatus, while reducing the size of the display apparatus. In addition, since the number of optical sheets used in the display apparatus is reduced, the manufacturing cost for the display apparatus may be reduced.

DETAILED DESCRIPTION OF EXEMPLARY EMBODIMENTS

Hereinafter, a display apparatus according to an embodiment of the present invention will be described with reference to the accompanying drawings. It should be understood that embodiments of the present invention are not limited to appended drawings but include all modifications, equivalents and alternatives within the spirit and scope of the present invention as defined in the following claims. The same reference numerals are used to designate the same elements throughout the drawings. For the purpose of explanation, a portion of a display panel on which an image is displayed will be referred to as an upper portion or a front portion, and a portion opposite to the upper portion or the front portion will referred to as a lower portion or a rear portion.

Figure 1:
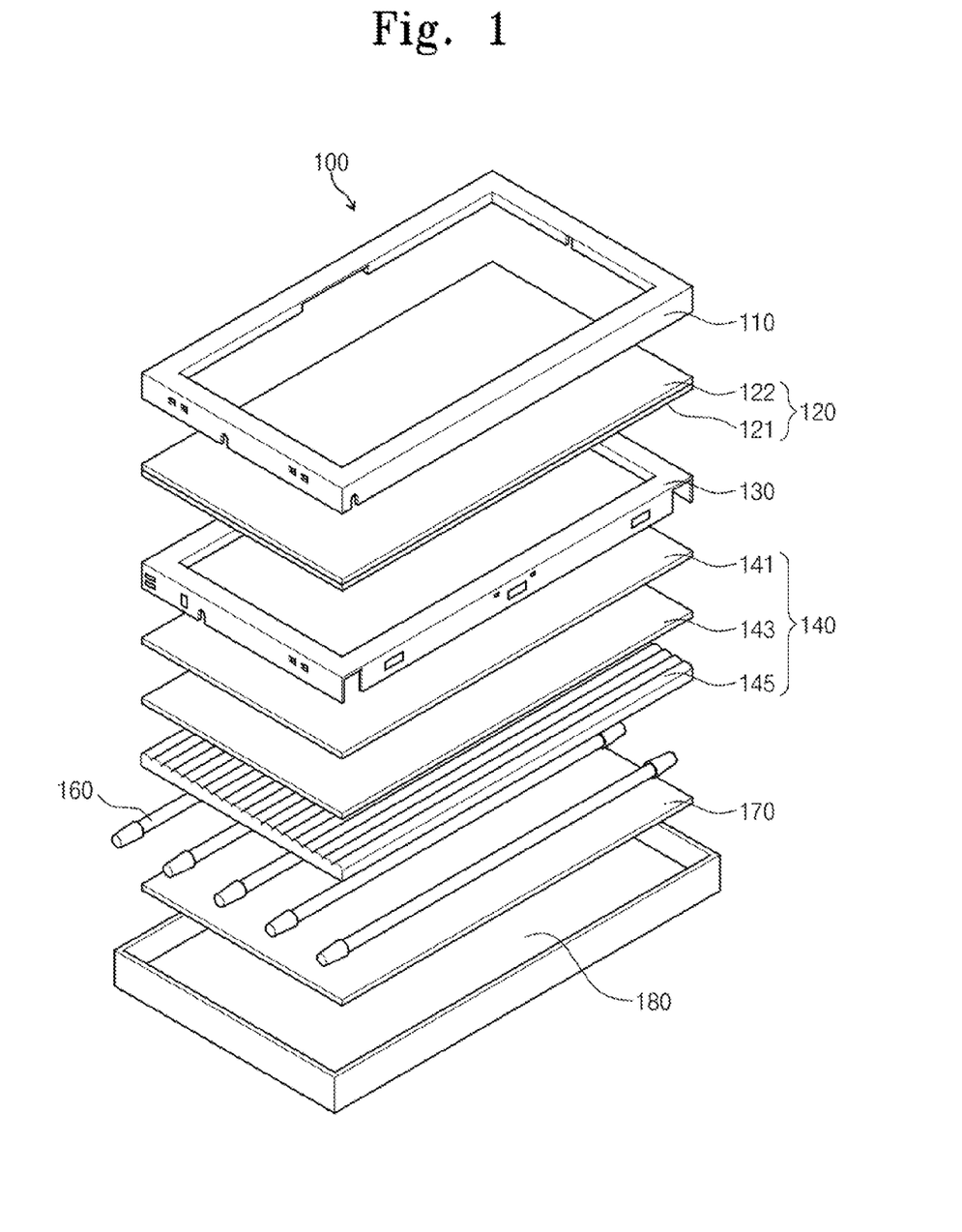
FIG. 1 is an exploded perspective view showing a display apparatus according to one embodiment of the present invention.

FIG. 1 is an exploded perspective view showing a display apparatus 100 according to an exemplary embodiment of the present invention.

Referring to FIG. 1, the display apparatus 100 according to an embodiment of the present invention includes a display panel 120 displaying an image, a backlight unit supplying light to the display panel 120, a mold frame 130 supporting the display panel 120 and the backlight unit, and upper and lower covers 110 and 180 coupled to each other to receive the display panel 120, the backlight unit and the mold frame 130 therein.

The display panel 120 has a rectangular shape with long lateral sides and short lateral sides. The display panel 120 may have various sizes. For example, the size of the display panel 120 may be about 32 inches or more based on the length of a diagonal line of the display panel 120. Although conditions desirable for the 32-inch display panel are described according to one embodiment of the present invention, the present invention is not limited thereto. Embodiments of the present invention may be applicable for display panels having various sizes. The length of a diagonal line of the display panel 120 may correspond to the diagonal length of a display area in the display panel 120, or may correspond to the total diagonal length of the display area and a non-display area in the display panel 120.

Various display panels can be used for the display panel 120 without limitation if they can display images, but a non-emissive display panel that needs an additional light source is frequently used. The non-emissive display panel may include an LCD panel or an electrophoretic display panel. According to an exemplary embodiment of the invention, an LCD panel is used as the display panel 120.

If an LCD panel is used as the display panel 120, the display panel 120 includes a first substrate 121, a second substrate 122 opposite to the first substrate 121 and a liquid crystal layer (not shown) interposed between the first and second substrates 121 and 122. The liquid crystal layer includes liquid crystal molecules, and light transmittance is adjusted according to the operation of the liquid crystal molecules, thereby forming images. However, since the liquid crystal molecules are non-emissive, a light source is necessary to display the images.

The backlight unit is disposed behind the display panel 120 to supply the light to the display panel 120.

The backlight unit includes a plurality of light sources 160 disposed behind the display panel 120, an optical member 140 provided between the display panel 120 and the light sources 160, and a reflective sheet 170 disposed behind the light sources 160 in parallel to the display panel 120.

The light sources 160 are provided to supply light to the display panel 120 through the optical member 140 which will be described later in detail. The light sources 160 may be a cold cathode fluorescence lamp (CCFL), an external electrode fluorescent lamp (EEFL), a hot cathode fluorescence lamp (HCFL), etc. The CCFL, EEFL or HCFL may be substantially parallel, extending in one direction. In addition, a light emitting diode (LED) may also be used as the light source. If an LED is used as the light source, the LED serves as a point light source. In addition, an LED may serve as a linear light source like the CCFL, EEFL or HCFL by aligning a plurality of LEDs in a row.

The optical member 140 adjusts the light generated from the light sources 160 and supplies the light to the display panel 120. The optical member 140 includes a diffusion plate 145 and optical sheets 141 and 143.

The diffusion plate 145 is disposed between the light sources 160 and the display panel to diffuse the light generated from the light sources 160.

The diffusion plate 145 may include a transparent polymer resin such as polycarbonate, polystyrene, polymethylmethacrylate, or methacrylate styrene.

The optical sheets 141 and 143 are disposed between the diffusion plate 145 and the display panel 120, and include a protective sheet 141 and a prism sheet 143. The optical sheets 141 and 143 adjust properties of the light supplied to the display panel 120, such as intensity and distribution. Optical sheets 141 and 143 may include a plurality of protective sheets 141 and a plurality of prism sheets 143. In addition, two or three optical sheets 141 and 143 may be overlapped with each other in use. The protective sheet 141 or the prism sheet 143 may be removed depending on the degree of light diffusion of the light diffusion plate 145.

The prism sheet 143 focuses the light diffused by the diffusion plate 145 in the direction perpendicular to a plane of the display panel 120. Most light that has passed through the prism sheet 143 propagates perpendicular to the display panel 120, to achieve a substantially uniform brightness distribution. The protective sheet 141 is placed at the uppermost portion of the optical sheets to protect the prism sheet 143 from scratching.

The reflective sheet 170 is provided below the light sources 160. The reflective sheet 170 reflects light propagating away from the display panel 120, toward the display panel 120. In particular, the reflective sheet 170 reflects light propagating downward from the light source 160 such that the light is directed upward.

The mold frame 130 is provided along the edge of the display panel 120. The mold frame has a substantially rectangular ring shape. The mold frame 130 supports the display panel 120 and the optical member 140. The mold frame 130 is coupled with the lower cover 180 to receive the optical member 140, the light source 160 and the reflective sheet 170 therein. Although a single mold frame 130 is shown in the drawing, plural mold frames may be provided in the form of a mold frame assembly.

The lower cover 180 is provided below the reflective sheet 170 to receive the display panel 120, the optical member 140, the light source 160 and the reflective sheet 170 therein.

The upper cover 110 is coupled with the lower cover 180 to support a front edge of the display panel 120. A display window is formed in the upper cover to expose a display area of the display panel 120. In addition, a coupling unit, such as a screw hole (not shown), is formed on a lateral side of the upper cover 110 to be coupled with the lower cover 180 using a screw.

The upper cover 110 is coupled with the lower cover 180 to receive the display panel 120, the optical member 140, the light sources 160 and the reflective sheet 170 therebetween.

As mentioned above, the display panel 120 is non-emissive, like the LCD panel, so the light sources 160 are used to supply the light. In this case, the light sources 160 serve as point light sources or linear light sources as shown in FIG. 1. Accordingly, if light emitted from the light sources 160 is directly transmitted to the display panel 120, dark portions and bright portions appear in the images realized by the display panel 120 according to the light intensity, degrading image quality.

To substantially prevent dark portions and bright portions from appearing in the display panel 120, light intensity should be uniformly maintained. To this end, the number of light sources 160 may be increased to reduce the distance between adjacent light sources 160, or the light path from the light source 160 may be changed to uniformly supply light to the display panel 120.

However, increasing the number of light sources 160 to reduce the distance between them increases the cost for the light sources 160 and may require additional power consumption to drive the light sources 160. In this regard, it is desirable that the light be uniformly supplied to the display panel 120 without increasing the number of light sources 160. According to an embodiment of the present invention, light output from the linear light sources or the point light sources with specific directionality is diffused by the diffusion plate 145 in various directions, resulting in a uniform distribution of light.

Figure 2:
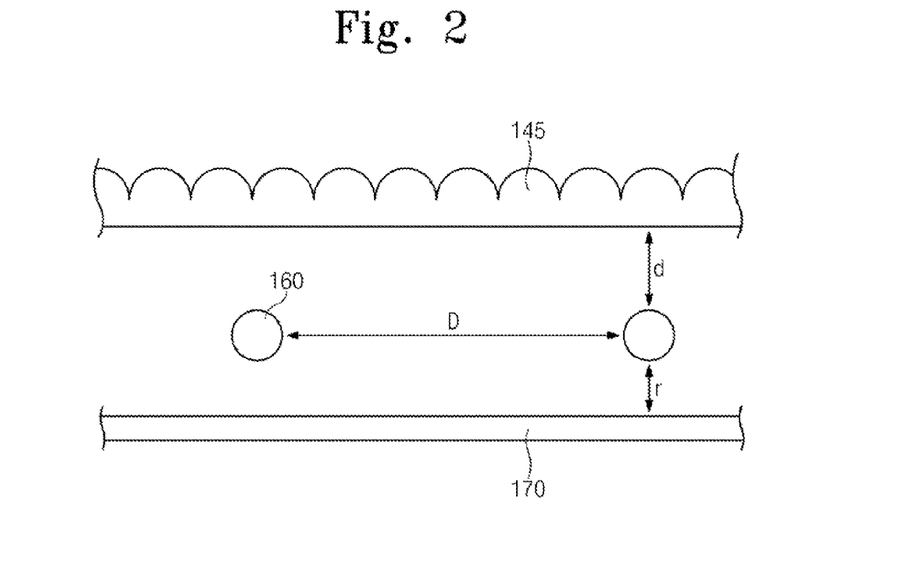
FIG. 2 is a schematic sectional view showing an arrangement of a diffusion plate and a light source according to one embodiment of the present invention.

FIG. 2 is a sectional view showing the arrangement of the diffusion plate 145 and the light sources 160 according to an embodiment of the present invention.

Referring to FIG. 2, the diffusion plate 145 according to an embodiment of the present invention is disposed above plural light sources 160 while being spaced apart from the light sources 160 by a first interval d. In addition, the light sources 160 are sequentially disposed while being spaced apart from each other such that two adjacent light sources 160 have a second interval D therebetween.

For a conventional diffusion plate, the interval between the light sources is minimized and the distance between the light sources and the diffusion plate is maximized render unobservable any variations of the light intensity. Thus, according to the conventional art, the distance between two light sources is smaller than that of an embodiment of the present invention and the distance between the diffusion plate and the light sources is greater than that of an embodiment of the present invention. However, according to an embodiment of the present invention, the interval between two light sources, that is, the second interval D, is enlarged, and the distance between the diffusion plate and the light sources, that is, the first interval d, is narrowed using the diffusion plate 145. The interval between two adjacent light sources may be about 43 mm to about 58 mm, and the distance between one of the light source 160 and the diffusion plate 145 may be about 16 mm to about 20 mm.

In addition, the distance r between the light sources 160 and the reflective sheet 170, which is provided below the light sources 160 to reflect the light output from the light source 160 toward the display panel, may decrease. The distance r between the light source 160 and the reflective sheet 170 may be in the range of about 4 mm to about 5 mm.

Figure 3:
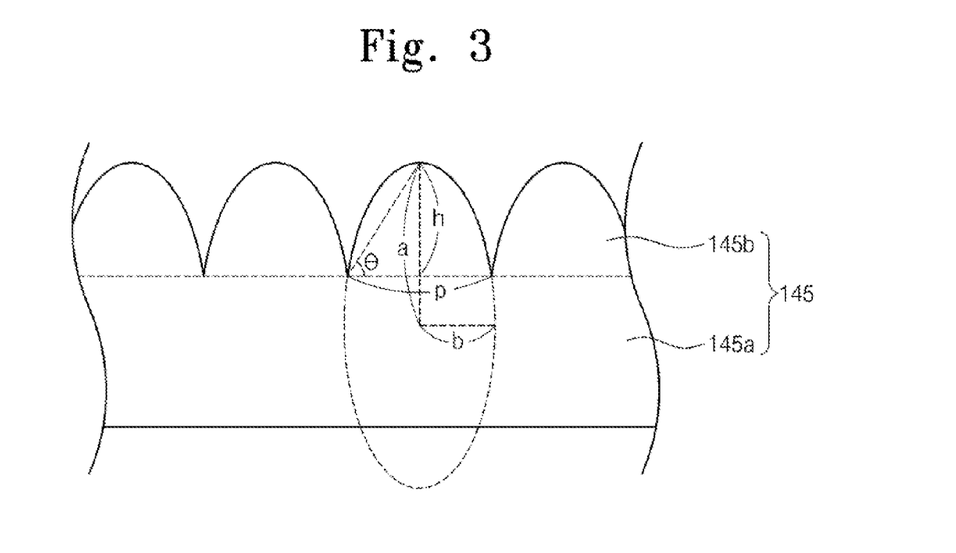
FIG. 3 is a sectional view showing a portion of the diffusion plate.

FIG. 3 is a sectional view showing a portion of the diffusion plate shown in FIG. 2.

Referring to FIG. 3, the diffusion plate 145 includes a base 145a and a plurality of convex ridges 145b.

The base 145a includes a top surface and a bottom surface opposite to the top surface, and has a rectangular plate shape having a size similar or equal to the size of the display panel 120.

The convex ridges 145b are provided on the top surface of the base 145a. The convex ridges 145b may extend in a direction parallel to one lateral side of the base 145a (see FIG. 1), and parallel to a linear light source, if used.

The convex ridges 145b may be integrally formed with the base 145a. An injection molding scheme or an extruding scheme may be employed to integrally form the convex ridges 145b with the base 145a. The method of manufacturing the diffusion plate 145 will be described later in detail.

The diffusion plate 145 has a thickness of about 0.5 mm to about 2.0 mm. If the thickness of the diffusion plate 145 is less than 0.5 mm, the diffusion plate 145 may be easily broken. On the contrary, if the thickness of the diffusion plate 145 is more than 2.0 mm, the convex ridges 145b may not be as easily formed, lowering manufacturing productivity.

A planar section of each convex ridge, which is perpendicular to the top surface, has the shape of a segment of an ellipse. The elliptical segment includes an elliptical arc, wherein a shape of the elliptically arc is described by a chord linking both ends of the elliptical arc with each other.

A length (h) between the vertex of each convex ridge 145b and the top surface of the base 145a is obtained through Equation 1, below. In Equation 1, p refers to a length of the chord of the ellipse. The chord length is also called a pitch because the convex ridges 145 are repeatedly formed in the same pattern.

$$h = \frac{1}{2} p \cdot \tan\theta \qquad \text{Equation 1}$$

The ellipse has a major axis (a) and a minor axis (b). The minor axis (b) is the axis parallel to the top surface of the base 145a, and the major axis (a) is the axis perpendicular to the top surface of the base 145a and the minor axis (b).

The range of the pitch is predetermined to minimize the moiré effect. The moiré effect is caused by interference of light passing through two patterns having different respective periods. The moiré effect occurs due to generation of light having a period greater than that of an original pattern. Thus, the moiré effect may be minimized by adjusting the pitch such that the light period is set smaller than the period of the original pattern.

In the display apparatus, components having periodicity include pixels of the display panel 120 and prisms of the prism sheet 143 of the optical member 140. In general, the pixel pitch in the display panel 120 is about 300 μm to about 600 μm, and the prism pitch in the prism sheet 143 is about 50 μm to about 250 μm. Thus, the pitch of the diffusion plate 145 is set to about 150 μm to about 300 μm to prevent occurrence of the moiré effect in relation to the pixels and the prism sheet 143. If the pitch of the diffusion plate 145 is less than 150 μm, the size of the convex ridge 145b is so reduced, increasing the manufacturing difficulty of the convex ridge 145b, thus increasing manufacturing cost. On the contrary, if the pitch of the diffusion plate 145 exceeds 300 μm, the moiré effect may occur.

Meanwhile, the distance (h) between the vertex of the convex ridge 145b and the top surface of the base 145 is in the range of about 70 μm to about 200 μm. The distance (h) is related to the pitch of the diffusion plate 145. If the distance (h) increases, the pitch also increases. Therefore, if the diffusion plate 145 is manufactured with the distance (h) less than 70 μm, the pitch is also reduced, increasing the manufacturing difficulty and cost of the convex ridges 145b. In contrast, if the distance (h) exceeds 200 μm, the convex ridges 145b may be too large to be easily manufactured by injection molding or extrusion, thus, increasing the manufacturing cost for the convex ridges 145b. In addition, since pitch also increases, there is an increased possibility of the moiré effect.

However, embodiments of the present invention are not limited to the above dimensions of the pitch and the distance (h). According to another embodiment of the invention, the convex ridges 145b may be manufactured with the pitch less than 150 μm and the distance (h) less than 70 μm through manufacturing processes other than injection molding or extrusion.

Figure 4:
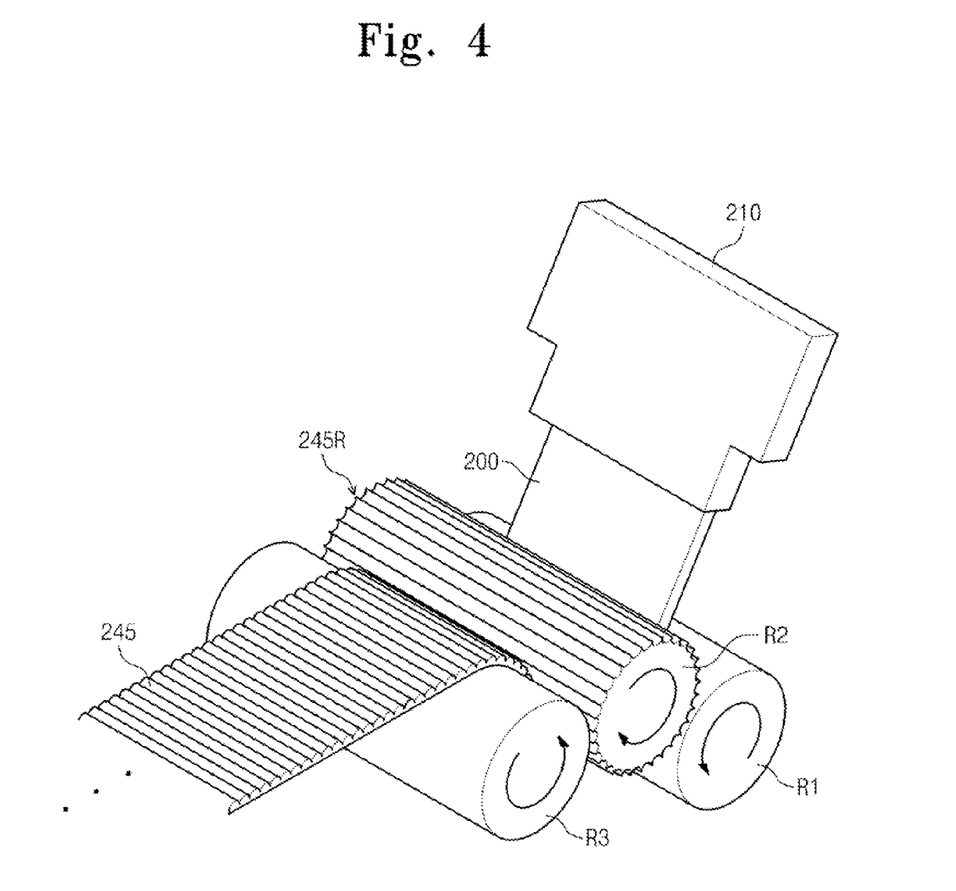
FIG. 4 is a perspective view showing the diffusion plate being manufactured by an extruding machine.

The diffusion plate 145 may be manufactured through extrusion or injection molding by using a polymer resin. FIG. 4 is a perspective view showing the diffusion plate 145 being manufactured by an extruder as an example.

Referring to FIG. 4, the extruder includes a feeder 210 that feeds molten polymer resin 200 and rollers. The rollers include a first roller R1, a second roller R2 and a third roller R3. The first roller R1 engages with the second roller R2 to press the molten polymer resin 200 into a plate shape. The third roller R3 engages with the second roller R2 to change the traveling direction of the molten polymer resin 200 that has been pressed into the plate shape.

The first roller R1 is provided with predetermined patterns (not shown) to form concave-convex patterns on the surface of the molten polymer resin 200 that makes contact with the first roller R1 being rotated.

The second roller R2 is formed with concave sections 245R on the surface thereof to form convex ridges on the surface of the molten polymer resin 200 when the second roller R2 rotates together with the first roller R1. The concave sections 245R extend along the rotating axis of the second roller R2 and have shapes opposite to the shapes of the convex ridges to be formed. Therefore, when the second roller R2 rotates, the concave sections 245R make contact with the top surface of the polymer resin 200, so that a plurality of convex ridges are formed on the top surface of the polymer resin 200.

When the polymer resin 200 has passed through the first roller R1 to third roller R3, a pattern plate 245 with convex ridges forms on the top surface thereof. Since the polymer resin 200 is cured while passing through the first roller R1 to third roller R3, the pattern plate 245 is in a cured state. Then, the pattern plate 245 is cut into sections of a predetermined size by taking the size of the display panel 120 into consideration in order to manufacture the diffusion plate 145 as shown in FIG. 3. The pattern plate 245 may be subject to an additional curing process after passing through the first roller R1 to third roller R3.

If the concave section 245R formed on the second roller R2 is cut perpendicularly to the rotating axis of the second roller R2, the concave section 245 has an elliptical shape corresponding to the shape of the convex ridge 145b formed on the diffusion plate 145 shown in FIG. 3.

The elliptic equation defining the concave sections 245R and the convex ridges 145b is as follows.

$$Ax^2 + By^2 + \sum_{n=0}^{2} C_n x^n + D = 0 \quad \text{Equation 2}$$

In Equation 2, A, B and D are coefficients.

$C_0$ is a non-zero constant having a predetermined value. According to the diffusion plate 145, $C_1$ is zero, and $C_2$ is $C_0/p^2$, wherein p is the length of the chord in the convex ridge 145b, that is, the pitch.

In Equation 2, $$\sum_{n=0}^{2} C_n x^n$$

is a term of order 2 to compensate for the difference between the actual elliptical shape of the diffusion plate and the ideal elliptical shape of the diffusion plate as designed.

Such differences are caused by the manufacturing process for the diffusion plate 145. As described above, the diffusion plate 145 is manufactured by using the polymer resin 200. The polymer resin 200 may be compressed through the pressing and curing processes. The compressibility of the polymer resin 200 depends on the interval between the first roller R1 and the second roller R2, the interval between the second roller R2 and the third roller R3, the thickness of the pattern plate 245 corresponding to the intervals, the temperature of the first to third rollers R1 to R3, and the type of the polymer resin 200.

According to an embodiment of the present invention, concave sections satisfying Equation 2 are formed on the second roller R2 by predicting the compressibility of the polymer resin 200 which may occur when the diffusion plate 145 is manufactured by using the polymer resin 200. Thus, the ideal elliptic equation is adjusted to reflect the compressibility of the polymer resin 200. $C_0$ is determined through experiment by taking into consideration variables related to the compressibility.

Consequently, a diffusion plate having the convex ridges configured as designed is manufactured.

Figure 5:
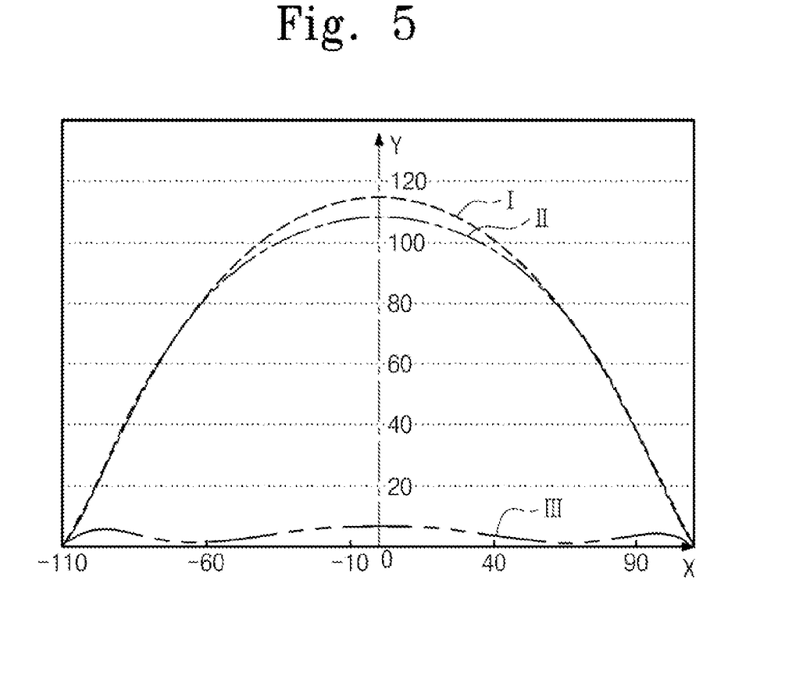
FIG. 5 is a graph showing an actual convex curve of a diffusion plate in comparison with an ideal convex curve of a diffusion plate.

FIG. 5 is a graph showing an actual convex curve in comparison with an ideal convex curve. Referring to FIG. 5, curve I represents an ideal convex section satisfying an ideal elliptical equation in which a ratio of a major axis to a minor axis is 3:1, and curve II represents an actual convex section formed on a diffusion plate manufactured using an extruder formed with a concave section satisfying an ideal elliptic equation. Curve III represents a difference between the ideal convex section and the actual convex section of the diffusion plate. Each curve has a elliptical segment with an angle (θ) of 47°.

As shown in FIG. 5, the shape of the actual convex section may differ from the shape of the convex section that is originally designed. In particular, the height of the actual convex section may be slightly lower. In addition, the pitch of the actual convex sections may also differ from the originally designed pitch when the angle (θ) is changed.

This difference between the actual convex section and the ideal convex section may exert an influence upon the light transmission path, thereby degrading the diffusivity of the diffusion plate. For this reason, the light uniformity of the display apparatus may deteriorate.

Figure 6:
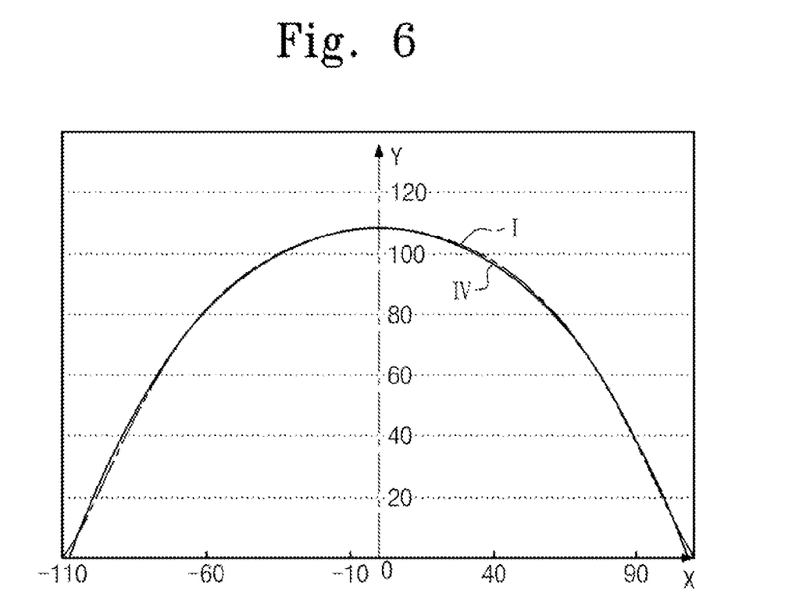
FIG. 6 is a graph showing a curve of an actual convex section in comparison with a curve of a convex section obtained by using an ellipse equation.

FIG. 6 is a graph comparing a curve of an actual convex section with a curve of a convex section obtained using the elliptic equation of Equation 2. Referring to FIG. 6, curve II represents the convex section satisfying Equation 2, and curve IV represents the actual convex section formed on the diffusion plate, manufactured using an extruder formed with a concave section satisfying Equation 2. Each curve has a elliptical segment with an angle ($\theta$) of 47°.

As shown in FIG. 6, the shape of the actual convex section is very similar to the shape of the convex section as originally designed. In particular, the height of the actual convex section is substantially identical to that of the ideal convex section and the pitch is maintained as designed even if the angle ($\theta$) changes. Thus, a diffusion plate having convex ridges the same as designed may be manufactured by using Equation 2.

Figure 7A:
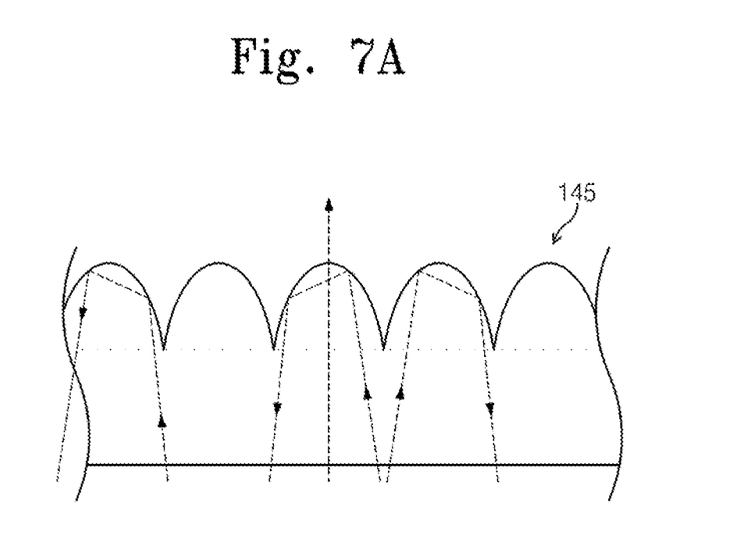
FIGS. 7A and 7B are views showing a route of light incident into the diffusion plate of FIG. 3.
Figure 7B:
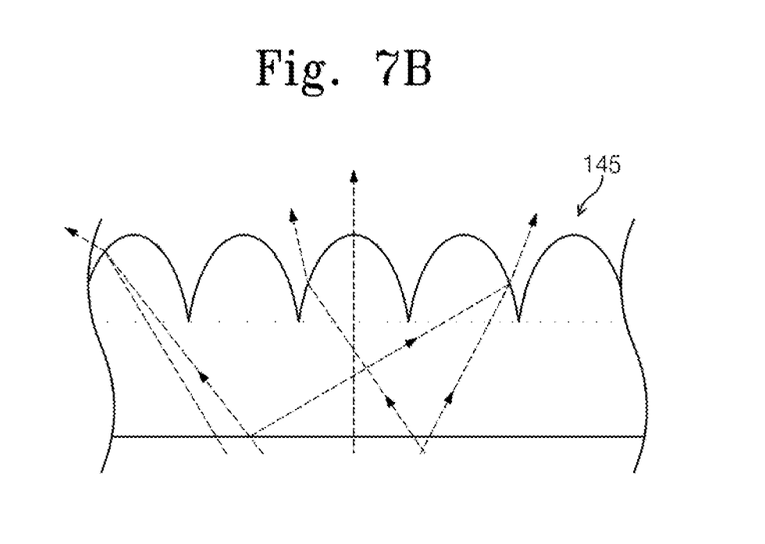

FIGS. 7A and 7B are views showing a path of light incident into the diffusion plate of FIG. 3.

Referring to FIGS. 7A and 7B, light that is incident substantially perpendicular to the bottom surface of the base is mostly totally reflected from the diffusion plate 145, while light incident oblique to the bottom surface of the base reflects and refracts and then outputs through the top surface of the diffusion plate 145.

Light incident onto the diffusion plate 145 is strongest in intensity at a region above the light sources 160, and weakest in intensity at a region between the light sources 160. As described above, a diffusion plate 145 according to an embodiment of the present invention reflects most light at the region above the light sources 160 where most light is incident substantially perpendicular to the bottom surface of the base, and outputs most light through the top surface of the diffusion plate 145 at the regions spaced apart from the light sources 160 where most light is incident oblique to the bottom surface of the base. Accordingly, a diffusion plate 145 of an embodiment of the present invention decreases output through the top surface of the diffusion plate 145 of light incident perpendicular to the bottom surface of the diffusion plate 145, so that the intensity of light output from the diffusion plate 145 is more uniformly distributed.

As described above, according to an embodiment of the present invention, a diffusion plate may be manufactured as it is designed, to adjust the uniformity and diffusivity of light. Thus, the number of light sources may be reduced. In addition, the distance between the light sources and the diffusion plate and between the light sources and the reflective sheet are reduced, enabling a slimmer display apparatus, lowering power consumption and manufacturing cost.

Although exemplary embodiments of the present invention have been described, it is understood that the present invention should not be limited to exemplary embodiments described herein but various changes and modifications can be made by one ordinary skilled in the art within the spirit and scope of the present invention as hereinafter claimed.

What is claimed is:

1. A display apparatus comprising:
a display panel;
a plurality of light sources disposed below the display panel to emit light; and
a diffusion plate disposed between the display panel and the plurality of light sources to diffuse the light, the diffusion plate comprising a base having a top surface and a bottom surface, and a plurality of parallel convex ridges formed on the top surface of the base,
wherein a planar section of each convex ridge perpendicular to the top surface of the base has an elliptically shaped arc segment, wherein a shape of the elliptically arc segment is described by a chord linking both ends of the arc segment, wherein the ellipse satisfies $$Ax^2 + By^2 + \sum_{n=0}^{2} C_n x^n + D = 0$$

wherein, A, B and D are coefficients, $C_0$ is a non-zero constant having a predetermined value, $C_1$ is zero, and $C_2$ is $C_0/p^2$ wherein p is a length of the chord, wherein concave sections satisfying the above equation are formed on a second roller of a multi-roller apparatus by predicting a compressibility of a polymer resin used to fabricate the diffusion plate, an ideal elliptic equation is adjusted to reflect the compressibility of the polymer resin, and $C_0$ is determined to represent an actual shape of the planar section of each convex ridge.

2. The display apparatus of claim 1, wherein the length of the chord is about 150 µm to about 300 µm.

3. The display apparatus of claim 2, wherein a distance between a vertex of each convex section and the top surface of the base is about 70 µm to about 200 µm.

4. The display apparatus of claim 1, wherein the diffusion plate is made of a resin selected from a group comprising polycarbonate, polystyrene, polymethylmethacrylate, and methacrylate styrene.

5. The display apparatus of claim 1, wherein the convex ridges are integrally formed with the base and extend in one direction.

6. The display apparatus of claim 1, wherein the display panel has a rectangular shape, and the plurality of light sources extends in a direction parallel to the convex ridges.

7. The display apparatus of claim 6, wherein each light source comprises one of a cold cathode fluorescent lamp, an external electrode fluorescent lamp, a hot cathode fluorescent lamp and a light emitting diode.

8. The display apparatus of claim 6, wherein a distance between two adjacent light sources is about 43 mm to about 58 mm.

9. The display apparatus of claim 8, wherein a distance between each light source and the diffusion plate is about 16 mm to about 20 mm.

10. The display apparatus of claim 1, further comprising a plurality of optical sheets disposed between the display panel and the diffusion plate.

11. A diffusion plate comprising:
a base having a top surface and a bottom surface opposite to the top surface; and
a plurality of convex ridges formed on the top surface of the base,
wherein a planar section of each convex ridge perpendicular to the top surface of the base has a elliptical arc segment, wherein a shape of the elliptical arc segment is described by a chord linking both ends of the arc, wherein the ellipse satisfies $$Ax^2 + By^2 + \sum_{n=0}^{2} C_n x^n + D = 0$$

wherein A, B and D are coefficients, $C_0$ is a non-zero constant having a predetermined value, $C_1$ is zero, and $C_2$ is $C_0/p^2$ wherein p is the chord length, wherein concave sections satisfying the above equation are fanned on a second roller of a multi-roller apparatus by predicting a compressibility of a polymer resin used to fabricate the diffusion plate, an ideal elliptic equation is adjusted to reflect the compressibility of the polymer resin, and $C_0$ is determined to represent an actual shape of the planar section of each convex ridge.

12. The diffusion plate of claim 11, wherein the length of the chord is about 150 μm to about 300 μm.

13. The diffusion plate of claim 12, wherein a distance between a vertex of each convex section and the top surface of the base is about 70 μm to about 200 μm.

14. The diffusion plate of claim 11, wherein the diffusion plate is made of a resin selected from a group comprising polycarbonate, polystyrene, polymethylmethacrylate, and methacrylate styrene.

15. The diffusion plate of claim 11, wherein the convex ridges are integrally formed with the base and extend in one direction.

16. The diffusion plate of claim 15, wherein the diffusion plate diffuses light and is disposed between a display panel having a rectangular shape and said light sources extending in a direction parallel to the convex ridges to emit light to the display panel.

17. A display apparatus comprising:
a reflective sheet;
a plurality of light sources disposed above the reflective sheet; and
a diffusion plate disposed above the plurality of light sources to diffuse the light, the diffusion plate comprising a bottom surface and a top surface formed as a plurality of parallel convex ridges,
wherein a planar cross section of each convex ridge perpendicular to the bottom surface has an elliptically shaped arc segment, wherein a shape of the elliptically arc segment is described by a chord linking both ends of the arc segment, wherein the ellipse satisfies $$Ax^2 + By^2 + \sum_{n=0}^{2} C_n x^n + D = 0$$

wherein, A, B and D are coefficients, $C_0$ is a non-zero constant having a predetermined value, $C_1$ is zero, and $C_2$ is $C_0/p^2$ wherein p is a length of the chord, wherein concave sections satisfying the above equation are formed on a second roller of a multi-roller apparatus by predicting a compressibility of a polymer resin used to fabricate the diffusion plate, an ideal elliptic equation is adjusted to reflect the compressibility of the polymer resin, and $C_0$ is determined to represent an actual shape of the planar section of each convex ridge.

18. The display apparatus of claim 17, wherein the reflective sheet reflects light emitted downward from the plurality of light sources towards the diffusion plate, and wherein light that is incident substantially perpendicular to the bottom surface of the diffusion plate is mostly totally reflected downward from the diffusion plate, while light incident oblique to the bottom surface of the diffusion plate is output through the convex ridges on the top of the diffusion plate.

19. The display apparatus of claim 17, wherein said light sources extend in a direction parallel to the convex ridges.

20. The display apparatus of claim 19, wherein a distance between light sources is greater than a distance from the light sources to the bottom surface of the diffusion plate, and the distance from the light sources to the bottom surface of the diffusion plate is greater than the distance from light sources to the reflective sheet.

* * * * *